United States Patent [19]

Helms

[11] Patent Number: 5,042,162

[45] Date of Patent: * Aug. 27, 1991

[54] COORDINATE MEASURING MACHINE WITH VIBRATION DAMPENING SYSTEM

[75] Inventor: Israel F. Helms, Coventry, R.I.

[73] Assignee: Brown & Sharpe Manufacturing Company, North Kingstown, R.I.

[ * ] Notice: The portion of the term of this patent subsequent to Sep. 25, 2007 has been disclaimed.

[21] Appl. No.: 405,541

[22] Filed: Sep. 11, 1989

Related U.S. Application Data

[63] Continuation-in-part of Ser. No. 309,692, Feb. 10, 1989, Pat. No. 4,958,437.

[51] Int. Cl.⁵ .......................... G01B 21/04; G01B 5/03
[52] U.S. Cl. ...................................... 33/503; 33/1 M; 248/559
[58] Field of Search ................ 33/503, 504, 505, 1 M, 33/556, 555, 558, 559; 248/559, 636, 638

[56] References Cited

U.S. PATENT DOCUMENTS

| | | | |
|---|---|---|---|
| 4,282,938 | 8/1981 | Minimidate | 173/162.2 |
| 4,595,166 | 6/1986 | Kurokawa | 248/559 |
| 4,635,892 | 1/1987 | Baker | 248/559 |
| 4,682,418 | 7/1987 | Tuss et al. | 33/1 M |
| 4,697,781 | 10/1987 | Hamano et al. | 248/559 |
| 4,706,788 | 11/1987 | Inman et al. | 248/636 |
| 4,716,656 | 1/1988 | Maddock et al. | 33/503 |
| 4,722,948 | 2/1988 | Hostettler | 528/59 |
| 4,798,006 | 1/1989 | Barnaby | 33/503 |
| 4,879,906 | 11/1989 | Meline et al. | 33/787 |

FOREIGN PATENT DOCUMENTS 0140079 2/1980 Fed. Rep. of Germany ....... 33/1 M

Primary Examiner—William A. Cuchlinski, Jr.
Assistant Examiner—C. W. Fulton
Attorney, Agent, or Firm—Wolf, Greenfield & Sacks, P.C.

[57] ABSTRACT

A vibration dampening system particularly for use in a gantry-type coordinate measuring machine. The vibration dampening system includes a vibration damper in the gantry structure, a vibration damper in the Z-rail, and means in the supports for the base for dampening vibrations, all of which work together cooperatively to damp vibrations in the coordinate measuring machine. The vibration damper in the gantry structure and in the Z-rail each comprises a substantial mass suspended by pads of material having high energy absorbence and a low rebound resilience. The vibration dampening means in the table means includes a layer of material which is highly energy absorbent and has a low rebound resiliency, and which is disposed between two rigid plates positioned between each supporting leg of the table and an underlying floor. The vibration dampening system is tuned to provide maximum energy absorbency at major modes of vibrations in the machine during acceleration and deceleration.

31 Claims, 5 Drawing Sheets

COORDINATE MEASURING MACHINE WITH VIBRATION DAMPENING SYSTEM

CROSS REFERENCE TO RELATED APPLICATION

This application is a continuation in part of Application Ser. No. 07/309,692 filed on Feb. 10, 1989 now U.S. Pat. No. 4,958,437.

FIELD OF THE INVENTION

This invention relates generally to machines with high precision positioning mechanisms movable along three coordinate axes, and more particularly, to vibration dampening mechanisms for gantry-type coordinate measuring machines.

BACKGROUND OF THE INVENTION

Machines with high precision positioning mechanisms are used in many industries for accurately measuring the tolerance of machine parts and other components as well as for positioning tools for performing highly precise operations. Typically, either a tool or a touch sensitive probe for position measurement is mounted on the end of a support structure that allows the probe or tool to be moved in three dimensions by selective translation along three orthogonal axes.

Gantry type support structures are commonly used in such machines, particularly coordinate measuring machines. Such a gantry-type structure typically includes a base, a table resting on the base, a gantry structure which rides on parallel, spaced rails, generally referred to as X-rails, which are supported by the base, and a carriage which rides on the gantry structure. A vertically movable element, typically referred to as a Z-rail, includes a touch sensitive probe or tool disposed on the lower end thereof. The Z-rail moves vertically with respect to the carriage, while the carriage travels horizontally along a rail, usually referred to as the Y-rail, disposed on the gantry structure. Air bearings are used to facilitate movement of the gantry structure on its associated rails, as well as movement of the carriage and Z rail. Typically, the gantry structure is driven only along one rail. The probe or tool disposed on the end of the Z rail therefore can be moved in three dimensions to be positioned at any point on the table.

Electronic sensors are provided on each rail for sensing the position of the probe or tool in terms of its X, Y and Z coordinates. Typically, a microcomputer is provided within the device which causes the probe to be moved through a sequence of specified X, Y and Z locations and remaining at each for a specified period of time to either measure or work on the part resting on the table.

In use, the gantry type structure is rapidly accelerated and decelerated to deliver the probe or tool to the point at which it is to perform its work or measurement. Such rapid movements are necessary so that measurements or work at each point can be performed rapidly and the total time for testing a part or performing work is not intolerably long. Such rapid accelerations and decelerations produce vibrations in the machine.

One source of such vibrations is the gantry structure itself. In part because such gantry type structures are generally driven only along one rail, vibrations are caused by the structure's inherent inertia. A torque is produced about the point at which the drive is coupled to the gantry-type structure during both acceleration and deceleration, and it may be assumed for most purposes that the torque is applied at the center of gravity of the gantry-type structure and has a moment arm which extends from the point of coupling of the drive to the structure to the center of gravity thereof. Since the gantry-type structure has a certain elasticity, and since during deceleration continued movement of the structure is resisted by the drive and by the bearings which maintain the proper positioning of the structure, this torque causes vibrations to be set up in the gantry about the point at which the gantry is coupled to the drive. These vibrations are then transferred to the air bearings coupling the gantry to the X-rails, and these air bearings can act like a spring.

Another source of vibrations is the Z-rail which typically is in an extended position depending downwardly from the carriage during movement thereof. Rapid acceleration and deceleration produces oscillation of the distal end of the Z-rail about the carriage, or about the point at which it is coupled to a Z-rail drive. These vibrations are created in much the same way as are the vibrations in the gantry structure, since the Z-rail also has a certain elasticity and since the inertia of the Z rail applies a torque about the point at which the Z-rail is coupled to the air bearings in the carriage. The Z-rail vibrations contribute significantly to the overall vibrations in the machine.

Finally, vibrations are also present in the table upon which the part to be tested or worked on is placed. These table vibrations are produced by the torque applied to the rails by the X-rail drive during rapid accelerations and decelerations of the gantry, and tend to be aligned in the direction of acceleration or deceleration. Such table vibrations can produce either movement of the entire table back and forth in a direction parallel to the X-rails, or twisting of the table about a vertical axis in which the one side of the table associated with one of the rails is moving in one direction, somewhat parallel to that rail, while the other side of the table associated with the other X rail is moving in an opposite direction somewhat parallel to its associated rail.

The vibrations produced in the carriage by its rapid acceleration and deceleration are relatively small, and do not contribute significantly to the overall vibrations in the machine. The carriage is positioned close to the Y-rail, and is held in position by a number of opposed air bearings. Because no portion of the carriage extends outwardly away from the Y-rail, little or no torque is applied by the carriage itself during acceleration, or deceleration.

Obviously, it is desirable to damp the vibrations out of the system as quickly as possible to avoid errors. For high precision coordinate measuring machines, it is essential that the measurements be taken when no vibrations are present, so that the precise alignment can be maintained. It is therefore necessary to delay making a measurement after rapid movement of the probe until the vibrations are reduced to an acceptably low level. The time required for the vibrations in the machine to damp out of the system is termed the settling time.

Certain characteristics of a gantry type positioning mechanism have a substantial effect on the amplitude and frequency of the vibrations in the structure. Very soft or dynamically marginal air bearings tend to increase the amplitude of vibration and settling time of the system. Also, if the bearings are unstable, particularly at a resonant frequency of the gantry type structure, the settling time will be increased. The amplitude of the vibrations and the length of the settling time also depend on the stiffness of the gantry structure and the Z-rail, as well as on the distance of the center of mass of the gantry from the X-axis drive and on the distance of the center of mass of the Z-rail from its drive. The amplitude of the vibrations will increase as the carriage is moved along the Y-rail away from the X-axis drive or as the Z-rail is moved away from the X-axis drive or as the Z-rail is extended from the carriage. This increase in amplitude occurs because the moment arm of the force and thus the applied torque increases.

Therefore, it is an object of the present invention to reduce vibrations in a gantry-type machine having a high precision positioning mechanism.

It is another object of the present invention to reduce vibrations in a coordinate measuring machine.

It is a further object of the present invention to provide vibration dampers for a coordinate measuring machine.

It is another further object of the present invention to reduce the settling time of vibrations in a gantry-type structure which are induced by acceleration and deceleration of the machine components during rapid measurements.

It is yet another object of the present invention to improve the throughput of a coordinate measuring machine.

SUMMARY OF THE INVENTION

According to the present invention, these and other objects and advantages are achieved in a machine having a three axis, high precision positioning mechanism, such as a coordinate measuring machine, by the vibration dampening system of this invention comprising a plurality of vibration dampers working cooperatively to quickly damp vibrations from the machine. This system is particularly suited for a machine having a gantry-type structure which includes a horizontally movable gantry, a carriage which rides horizontally on the gantry, and a third rail which is vertically movable with respect to the carriage. The gantry includes a bridge or Y-rail suspended between two supports. In a preferred embodiment, the vibration dampening system of this invention comprises three separate dampers, a gantry vibration damper, a Z-rail vibration damper, and a table vibration damper.

The gantry vibration damper of this invention includes a block having a substantial mass suspended from the gantry bridge and supported by one or more shock absorbing pads. The shock absorbing pads cause the block to vibrate at a slightly lower frequency than, but out of phase with respect to, the gantry, thereby acting to cancel out the vibrational motion of the gantry. Preferably, the gantry vibration damper is displaced from the X-rail drive coupling point in both the Y and Z directions, so that it will cancel out vibrations having moment arms in both the Y and Z directions. In a preferred embodiment, the block is mounted as far from the X-axis drive in the Y and Z directions as is practical to maximize its moment arm about the coupling point between the X-rail drive and the gantry structure.

In one embodiment, the block is suspended from a metal plate in noncontacting relation with the gantry structure. The plate rests on shock absorbing pads, which rest on the gantry structure. The shock absorbing pads are preferably constructed of a viscoelastic foam or elastomer which has high energy absorbency and low resiliency. A preferred example has a rebound resilience of less than 20%.

The Z-rail vibration damper of this invention is disposed within the Z-rail, typically at the lower distal end thereof, as close as possible to the probe or tool. The Z-rail vibration damper, in a preferred embodiment, comprises a block of substantial mass which rests on one or more shock absorbing pads which in turn rest on the bottom Z-rail plate. The block does not directly contact any portion of the Z-rail, either below the block, or along its sides. The shock absorbing pads upon which the block rests typically are similar to those found in the gantry vibration damper, and are preferably constructed of a viscoelastic foam or elastomer which has a high energy absorbency and a low resiliency. The pads cause the Z-rail block to vibrate at the slightly lower frequency than, but out of phase with respect to, the Z-rail to cancel out vibrational motion thereof.

In both the gantry vibration damper and the Z-rail vibration damper, the mass and configuration of the blocks, as well as the stiffness and dapping characteristics of the shock absorbing pads, are chosen so that the machine has the shortest settling time possible.

The table vibration damper is disposed in the table support. The table vibration damper comprises a plurality, typically four, support members, each of which rests on a pad. Each pad comprises at least two rigid plates having a shock absorbing layer disposed therebetween. This shock absorbing layer is preferably constructed of a viscoelastic foam, or an elastomer which has high energy absorbency and low resiliency.

The table vibration damper absorbs vibrations in the table, in the gantry and in the Z-rail. The vibrations are damped through both frictional and viscous dampening. The table damper does not isolate the machine structure from external vibrations. In this respect, it differs from conventional vibration isolation systems which are designed for significantly lower frequencies than structural resonant frequencies of a coordinate measuring machine, and for relatively low damping to provide maximum isolation efficiency. If the vibration dampening system of this invention is to be used with a conventional vibration isolation system, an additional large mass must be provided upon which the table vibration damper rests. This mass divorces the stiff and well damped energy absorber of the table vibration damper from the soft, and low damped vibration isolation system.

The gantry vibration damper, the Z-axis vibration damper, and the table vibration damper work together cooperatively to significantly damp the vibrations out of the machine during rapid acceleration and deceleration of the gantry structure. While each of the three vibration dampers contributes to this overall dampening effect, the majority of the damping is produced by the Z-rail and gantry dampers. The combined effect of these three vibration dampers causes the vibrations to be damped sufficiently to permit measurements to proceed in a coordinate measuring machine within the first two cycles of the generally sinusoidal plot of vibration amplitude versus time. Thus, a measurement can be performed on a part in roughly one twentieth of the time permitted in most prior art machines. For example, in most prior art machines, the settling time is of the order of 25 cycles or more, which is about three and one-half to four seconds. In the coordinate measuring machine of this invention, the settling time is of the order of 0.2 seconds, or two cycles.

BRIEF DESCRIPTION OF THE DRAWINGS

The objects, advantages and features of this invention will be more clearly appreciated from the following detailed description taken in conjunction with the accompanying drawings in which.

DETAILED DESCRIPTION OF THE INVENTION

In the following discussion, the vibration dampening system of the present invention is described in conjunction with a coordinate measuring machine. However, it is to be understood that this invention has equal applicability to other high precision positioning mechanisms that have gantry type structures, such as tooling machines.

Figure 1:
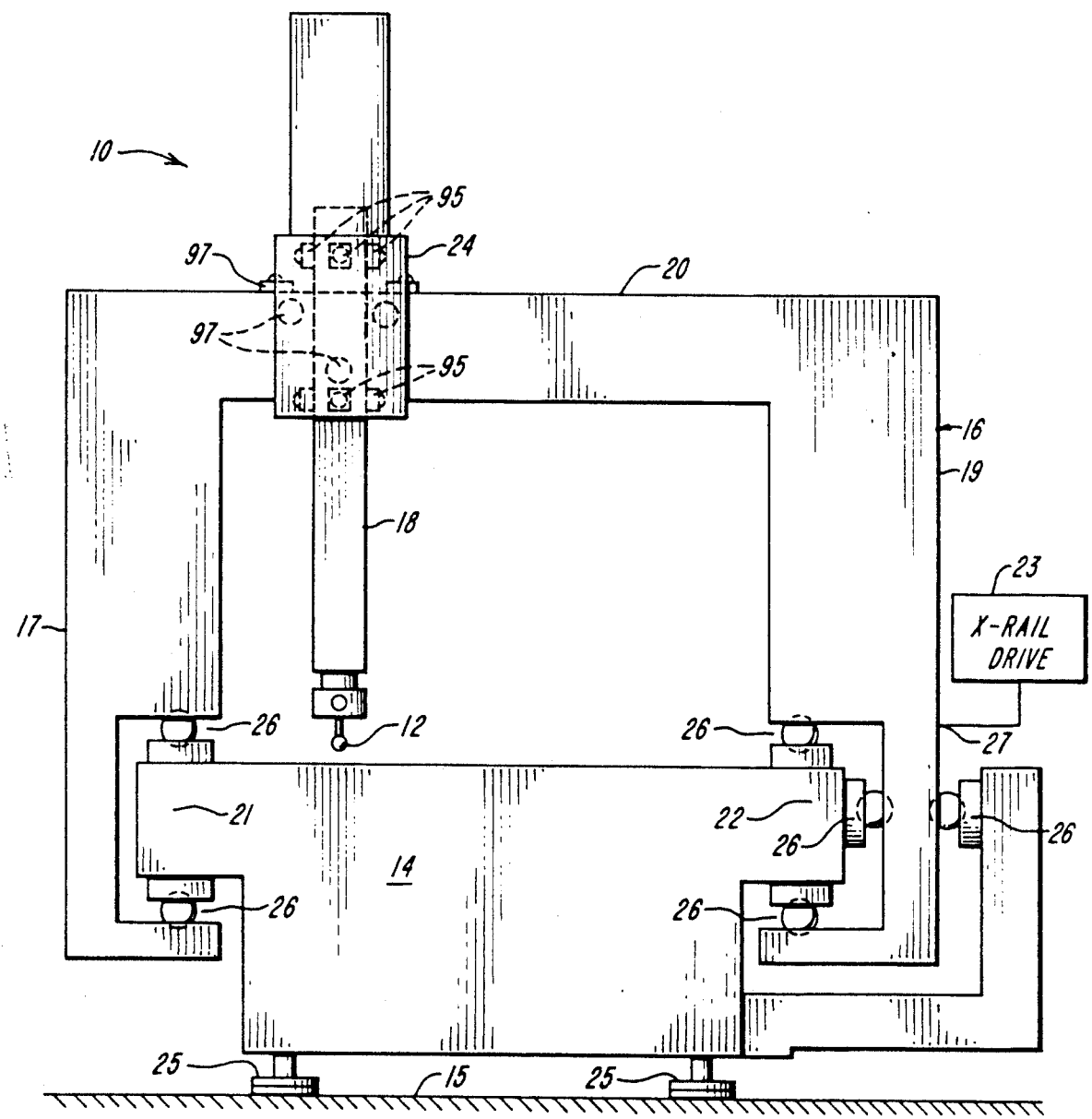
FIG. 1 is a schematic representation of a prior art three axis coordinate measuring machine.

FIG. 1 shows a typical prior art, three axis coordinate measuring machine 10 which includes a gantry-type structure 16, a table 14 on which a part to be tested is placed, vibration isolation mounts 25 for table 14, a first X-rail 21, a second, parallel X-rail 22, a Y-rail 20, a carriage 24 and a Z-rail 18 coupled to carriage 24. Machine 10 rests on floor 15. A touch sensitive probe 12 is mounted on the end of Z-rail 18. Structure 16 is formed of supports 17 and 19 and Y-rail 20 which forms a bridge between supports 17 and 19. Supports 17 and 19 ride on and are slidably coupled to X-rails 21 and 22 respectively to allow movement of structure 16 in a first direction (the X-axis direction). Carriage 24 is slidably coupled to Y-rail 20 to allow movement in a second direction (the Y-axis direction), and Z-rail 18 is slidably coupled to carriage 24 to allow movement in a third direction (the Z-axis direction). X-rails 21 and 22, Y-rail 20 and Z-rail 18 each are orthogonal to the other two rails. As a result, probe 12 can be moved in three dimensions by selective translation along the three orthogonal X, Y, and Z axes. For purposes of this discussion, the Z-axis is considered to be the vertical axis in FIG. 1 and is parallel to the Z-rail 18, the Y-axis runs horizontally across the page and is parallel to the Y-rail 20 and the X-axis is perpendicular to the page and is parallel to X-rails 21 and 22.

Z-rail 18 moves orthogonally to the plane defined by the X and Y-rails under the control of a first motorized Z-rail drive (not shown) contained within carriage 24. The entire Z-rail structure, which includes probe 12, Z-rail 18 and carriage 24, is movable in the Y-axis direction along rail 20 by means of a second motorized Y-rail drive (not shown). Finally, the entire structure 16, probe 12, Z-rail 18, and carriage 24 are driven together along X-rails 21 and 22 in the X-axis direction by X-rail drive 23. X-rail drive 23, the Y-rail drive and the Z-rail drive each is conventional and may be a gear drive, a rack and pinion system or any other suitable drive. Structure 16 is coupled to X-rail drive 23 only at point 27 along X-rail 22, as shown in FIG. 1.

Air bearings 26 are provided between the bearing surfaces on structure 16 and opposed bearing surfaces on X-rails 21 and 22 to allow structure 16 to move in a relatively frictionless manner with respect to the X-rails and to allow structure 16 to be accelerated and moved quickly and easily to a new position after a measurement is taken. Air bearings 26 maintain structure 16 accurately positioned relative to table 14 to prevent the introduction of error in measurements caused by misalignment of structure 16. The air bearing gaps between bearing surfaces on X-rails 21 and 22 and the opposed bearing surfaces on structure 16, which are exaggerated for purposes of illustration in FIG. 1, are preferably very narrow and are of the order of less than 1/1000 of an inch. Narrow air bearing gaps are desirable because they provide high stiffness and therefore reduce vibrations when structure 16 is accelerated to a new position. Carriage 24 also rides on air bearings (97) along Y-rail 20, and Z-rail 18 rides on air bearings (95) disposed within carriage 24 to provide relatively frictionless movement and to maintain alignment.

Generally, measurements are made of a part under test by bringing probe 12 into contact with a reference point on the part. The positions of structure 16 on X-rails, carriage 24 on Y-rail 20 and Z-rail 18 with respect to carriage 24 are electronically sensed and translated into digital information. The probe is then moved to other points on the part under test and the X, Y and Z coordinate information is again digitally recorded for each point. The coordinate information is then assimilated, such as by a microcomputer (not shown) within the coordinate measuring machine, to determine if the part meets predetermined specifications.

The acceleration and deceleration of the gantry 16 by the X-rail drive 23 causes vibrations in structure 16 about an axis which passes through point 27 where structure 16 is coupled to X-rail drive 23. Since the entire structure 16 can move in the X direction, i.e. in and out of the page, point 27 is not fixed in the X direction but only in the Y-Z plane, i.e. the plane of the page.

The inertia of structure 16 in motion or at rest causes a force to be applied to structure 16 as structure 16 is brought to rest or as it is accelerated respectively. When decelerating, this force is determined from the momentum of the structure. This application of force causes a torque to be applied to structure 16 about point 27. The torque applied about point 27 constitutes an infinite number of forces acting on all parts of the structure about moment arms of varying lengths. However, the total torque on structure 16 can be considered as being a single torque applied to structure 16 at its center of mass and having a moment arm measured from point 27 to the center of mass. Since carriage 24, Z-rail 18 and probe 12 comprise a substantial fraction of the total mass of structure 16, as probe 12 is moved farther away from point 27 in the Y and Z directions, the distance between point 27 and the center of mass of structure 16 also increases in the Y and Z directions. Since the torque applied about point 27 is the product of the applied force and the moment arm of the force, obviously the torque is the greatest when probe 12 is at its farthest point from point 27.

Because of the elasticity of structure 16 and because further movement of structure 16 is resisted by X-rail drive 23 and bearings 26 during deceleration, vibrations are produced in structure 16 about point 27. The vibrations have components in the plane defined by the X and Y axes as well as in the plane defined by the X and Z-axes, but not in the plane defined by the Y and Z-axes, since the forces exerted on structure 16 are perpendicular to the Y-Z plane (i.e. parallel to the X-axis).

Vibrations of table 14, which is supported by relatively flexible vibration isolation mounts 25, also occur as a result of the rapid acceleration and deceleration of structure 16. Such vibrations result from the rapid application of force to X-rail 22 by X-rail drive 23 during periods of rapid acceleration and deceleration and are typically aligned in the direction of deceleration and acceleration. Such vibrations typically comprise oscillations of table 14 in a direction parallel to X-rails 21 and 22, and can manifest themselves either as oscillations of table 14 in and out of the page, as shown in FIG. 1, or as oscillations in which X-rail 22 is moving in a direction opposite of X-rail 21, in and out of the page as shown in FIG. 1, to produce a twisting of table 14 about the Z-axis.

Further vibrations are produced by oscillation of Z-rail 18 about the point at which it is coupled to its associated air bearings 95 guiding movement of Z-rail 18 with respect to carriage 24. Such vibrations result from the normally extended position of Z-rail 18 in which probe 12 is normally spaced from carriage 24 during movement of structure 16 and carriage 24. The inherent inertia of Z-rail 18 produces a torque which acts about a moment arm measured from the point at which Z-rail 18 is coupled to its associated air bearings 95 to the center of gravity of Z-rail 18 in its extended position. The inherent elasticity of Z-rail 18 combined with this applied torque produces vibrations during periods of rapid acceleration and deceleration of structure 16 and carriage 24. Typically, these vibrations have components in the plane defined by the X and Z-axes and in the plane defined by the Y and Z axes.

The vibrations created by movement of carriage 24 along Y-rail 20 are significantly less than the vibrations created in Z-rail 18, structure 16 or on table 14. The lack of significant vibrations of carriage 24 is due in part to the fact that carriage 24 closely hugs Y-rail 20 along its length, and no part of carriage 24 is positioned at a significant distance from Y-rail 20, so that the torques applied to carriage 24 during rapid acceleration and deceleration are small. Vibrations of carriage 24 generally can be kept in check by the air bearings coupling carriage 24 to Y-rail 20. Therefore, vibrations of carriage 24 typically can be ignored for most purposes.

Eventually, all of these vibrations are converted to heat which is dissipated as the inherent energy absorbency of the system damps the vibrations. However, it takes a finite amount of time for the vibrations to damp out of the system to allow accurate and steady measurement of the part under test. This time is referred to as the settling time. The settling time for these vibrations is typically unacceptably long in prior art machines.

Figure 2:
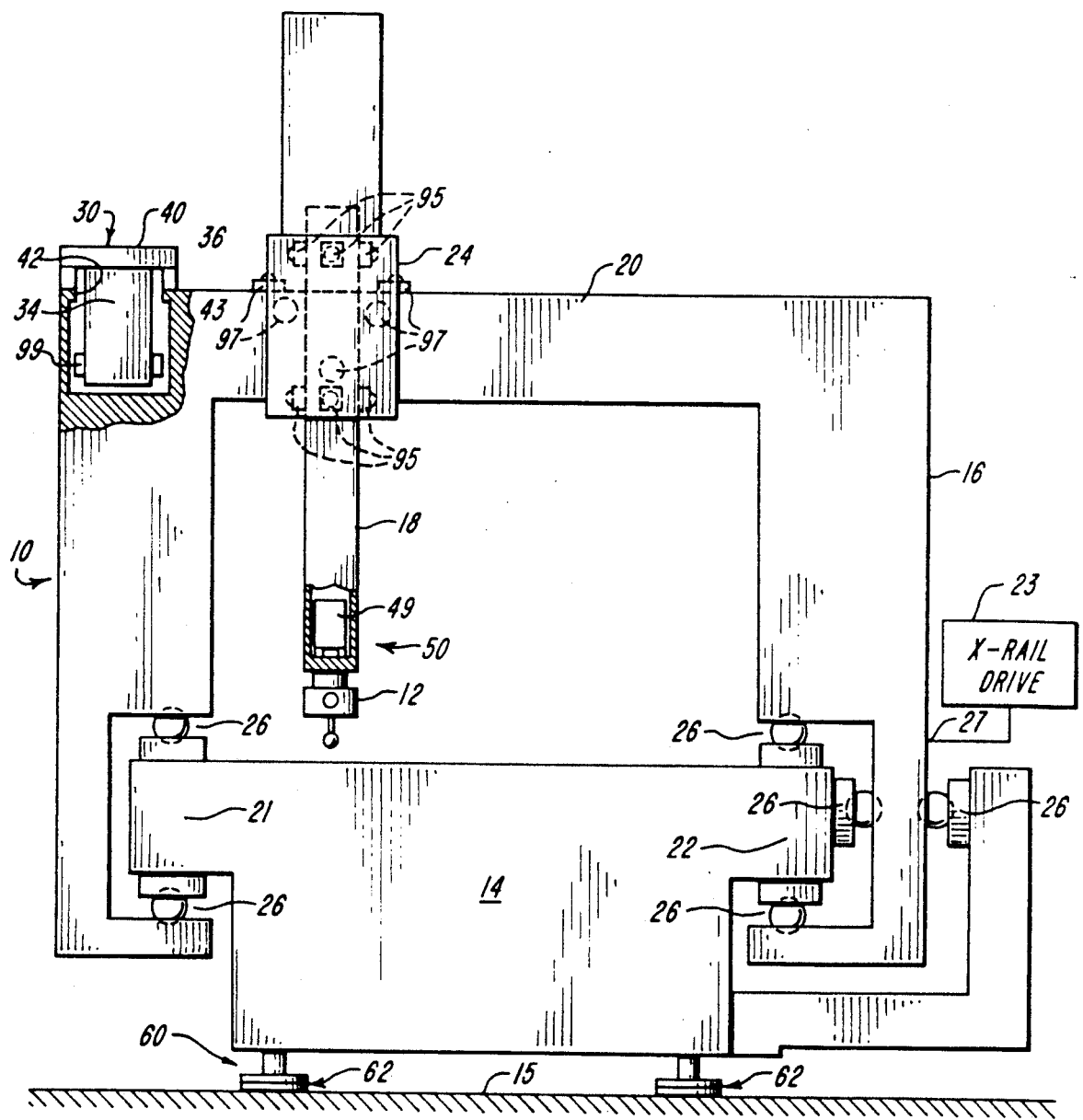
FIG. 2 is a schematic representation of a three axis coordinate measuring machine embodying the vibration damper of the present invention.

The vibration dampening system of the present invention will now be described with particular reference to FIG. 2. FIG. 2 shows the present invention as used in conjunction with a gantry-type coordinate measuring machine of the type illustrated in FIG. 1. Like numbers are used for like parts, where possible. The dampening system of this invention comprises a gantry vibration damper 30, a Z-rail vibration damper 50 and a table support vibration damper 60. Gantry vibration damper 30, Z-rail vibration damper 50 and table support vibration damper 60 work cooperatively to quickly damp virtually all of the acceleration and deceleration induced vibrations out of machine 10 to significantly reduce the settling time of the machine over that of prior art machines.

Gantry vibration damper 30 will now be described with particular reference to FIGS. 2 and 3. As shown in FIG. 2, vibration damper 30 is disposed on structure 16 at a point spaced from X-rail drive 23. Damper 30 typically comprises plate 40, block 34 having a substantial mass and shock absorbing pads 36. Block 34 preferably is rigidly attached to plate 40 and is suspended therefrom through a corresponding hole 42 in structure 16 so that the center of gravity of block 34 is disposed below plate 40. Block 34 can be formed of any solid, heavy material and can be of any shape. Block 34 typically is an elongated block of lead, iron or steel. Plate 40 must be rigid and typically is formed of steel. Plate 40 has a lateral extent greater than the dimensions of hole 42 so that edges 33 of plate 40 overlie portions 43 of Y-rail 20 on structure 16. Pads 36 are disposed between the undersurfaces of edges 33 of plate 40 and portions 43. Each of pads 36 is rigidly attached, such as by glue, at its top to edges 33 of plate 40 and, at its bottom, to portions 43 of Y-rail 20. Thus, plate 40 and block 34 are supported by pads 36 and block 34 is disposed in noncontacting relation with structure 16 and with the inside surfaces of hole 42. Four pads 36 are shown. However, any number of pads 36 may be used having any desired shape, so long as pads 36 support mass 34 and plate 40 in noncontacting relation with structure 16 and hole 42. Additional pads 99 may also be placed along the vertical walls of block 34 to ensure that block 34 never directly touches any part of structure 16 or the inside surfaces of hole 42.

Pads 36 are constructed of a low resiliency, highly energy absorbent material. Any material is acceptable which has high energy absorbency and low rebound resilience, i.e. less than 20% resiliency, as measured by the pendulum method as described by Zwick (DIN 53512). A preferred material for use in pads 36 has a Shore "00" hardness of 50 00, as measured according to ASTM D2240, a maximum compression set of 5% according to ASTM D-3-95, and a maximum ball rebound of 5% according to ASTM D3-574-1c. An example of a preferred material is a polyurethane viscoelastic foam or elastomer having relatively high hysteresis (good energy absorbency) and low rebound velocity. An example of a suitable foam or elastomer material is that manufactured in the manner described in U.S. Pat. No. 4,722,946 which is incorporated herein by reference. A commercially available foam or elastomer made in accordance with U.S. Pat. No. 4,722,946 is sold under the trademark VISCOLITE by Polymer Dynamics, Inc. of Lehigh Valley, PA. If a polyurethane foam such as VISCOLITE is used for pads 36, a thickness of about one half inch is preferred.

Damper 30 damps vibrations because of the inertia of block 34 during acceleration and deceleration of structure 16 which tends to create vibrations in damper 30 which are of a slightly lower frequency than, but out of phase with respect to, vibrations in structure 16. This out-of-phase relationship results from the lower natural frequency of damper 30 with respect to structure 16 and from a delay with respect to structure 16 in the application of torque by block 34 because of the inherent elongation characteristics of pads 36 which cause block 34 to stop moving during deceleration or start moving during acceleration only after pads 36 reach their limit of stretching or elongation in response to the inertia of block 34.

It is desirable to maximize the moment arm of damper 30 about point 27, because the longer the moment arm, the greater is the counter-torque applied to structure 16 by block 34, and the smaller is the force that is required to cancel out the vibrations of structure 16, and thus the less is the weight required for block 34. Damper 30 has its greatest damping effect if it is positioned as far away from point 27 in the Y and Z-axes directions as is practical. In a preferred embodiment, damper 30 overlies X-rail 21, and block 34 preferably is mounted at or above the center of mass for structure 16.

In operation, when structure 16 is rapidly accelerated and moved to a new point in the X-axis direction, structure 16 achieves a momentum which is a function of the mass of structure 16 and its velocity. Because of inertia, a torque is imparted to structure 16 about point 27 as structure 16 is decelerated by the resisting action of X-rail drive 23 and bearings 26. This torque is a function of the acquired momentum of the structure 16 and of the distance of the center of gravity of structure 16 from point 27. Damper 30 also achieves a certain momentum during movement of structure 16. Due to inertia, during deceleration, damper 30 also applies a torque to structure 16 about point 27. However, there is a delay in the application of torque to structure 16 by damper 30 because of the flexibility of pads 36 and because of the slightly lower frequency of natural vibration of damper 30. Pads 36 tend to elongate or stretch during deceleration, allowing block 34 to travel in the same direction for a slightly longer period of time than for structure 16. Eventually, pads 36 restrain further motion of block 34, but only after motion of structure 16 has been restrained by bearings 26 and X-rail drive 23. Because of the delayed application of torque by block 34, there is a phase delay between the vibrations of damper 30 and the vibrations of structure 16. Assuming that the resulting vibrations in block 34 of damper 30 and structure 16 are roughly sinusoidal, while the vibration of structure 16 has passed through the first half cycle of the sinusoid and is moving in the direction of the second half cycle, the vibration of block 34 is still in the first half cycle of the sinusoid. Therefore, the vibrations in structure 16 and the vibrations in block 34 are out of phase and tend to cancel each other out, resulting in deformation of pads 36. The torque applied by the mass of structure 16 is greater than the torque applied by smaller block 34, so that the vibrations are not immediately reduced to zero. However, the result is a rapid damping of the vibrations in structure 16 by block 34, thus decreasing substantially the settling time of the system. Pads 36 absorb these vibrations and the vast majority of the resulting vibrational energy is quickly dissipated as heat in pads 36.

Pads 36 are deformable in any direction, so that damper 30 not only tends to cancel out vibrations having moment arms about point 27 but also tends to cancel out any vibrations in structure 16 caused by rapid acceleration and deceleration of the Y-rail drive and Z-rail drive. The operation with respect to the Y-rail and Z-rail drives is the same as that for the X-rail drive. The vibrations in structure 16 caused by the Y and Z-rail drives are less significant than those caused by the X-rail drive and the measurement errors produced thereby are correspondingly smaller. The vibrations are less significant because the mass which is being moved by the Y and Z-rail drives is much less than the mass being moved by the X-rail drive, and the moment arms about which a torque is being applied are smaller.

Although block 34, plate 40 and pads 36 are all shown as having rectangular configurations, these elements may have any shape desired, including a circular or cylindrical shape, so long as the intended function is achieved. While pads 36 are shown disposed between plate 40 and portions 43, they can also be positioned between plate 40 and other supporting surfaces on structure 16, or between block 34 and portions of structure 16. Also, block 34 could be suspended from pads 36 which are attached to structure 16. Finally, in another alternative embodiment, block 34 may be positioned so that it rests on pads 36 which are in turn supported by a horizontal structural support element of structure 16. In this embodiment, the center of gravity of block 34 would be disposed above pads 36, but the position of block 34 horizontally along structure 16 would be as previously described. As in the other embodiments, block 34 would be in noncontacting relation with structure 16.

Figure 5:
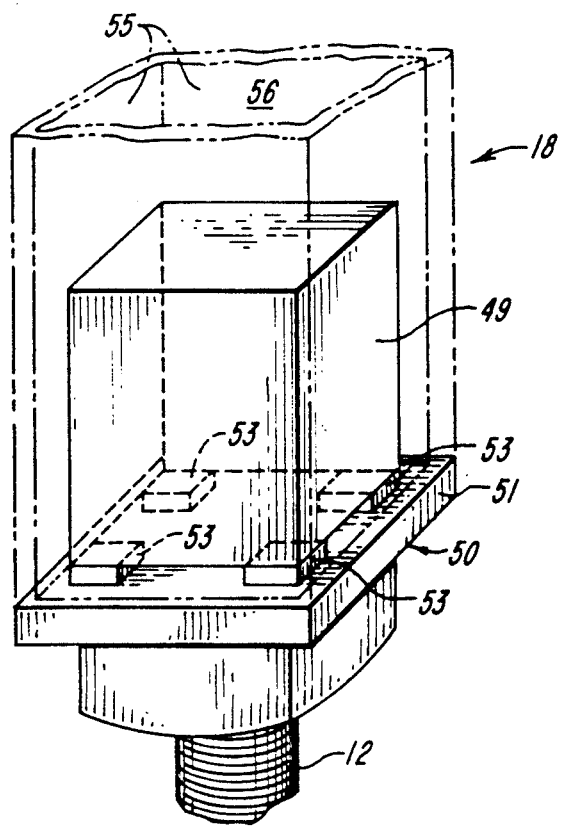
FIG. 5 is a partial, perspective view of the Z-rail damper of this invention.

Z-rail vibration damper 50 will now be described with particular reference to FIG. 5. Damper 50 includes a block 49 of substantial mass and pads 53. Typically, the lower end of Z-rail 18 includes a cavity 56 defined by generally vertical walls 55 of Z-rail 18. Disposed on the lower end of Z-rail 18 is a probe holding plate 51 to which probe 12 is mounted on a lower surface thereof. In a preferred embodiment, as shown in FIG. 5, block 49 rests on pads 53 which in turn are secured to plate 51. Typically, glue is used to secure pads 53 to plate 51 and block 49. Pads 53 space the lower surface of block 49 from plate 51, so that block 49 does not directly contact plate 51. In addition, block 49 is positioned within cavity 56 such that it does not directly contact walls 55 or any other part of Z-rail 18 at any point even during vibration thereof. Block 49 is connected to Z-rail 18 only through pads 53.

Block 49 is preferably mounted on plate 51 to place it at a position as far as possible from the point at which Z-rail 18 is coupled to its associated bearings 95. In this manner, the moment arm of damper 50 is maximized about the point at which the torque is applied, thereby maximizing the counter-torque applied to Z-rail 18 by block 49. Thus, the force required to cancel out the vibrations of Z-rail 18 is reduced to a minimum level, thereby reducing to a minimum the weight required for block 49. However, it is to be understood, that block 49 could be placed at a location closer to carriage 24 and still function in the manner desired. In addition, while the center of gravity of block 49 is shown as being positioned above pads 53 in FIG. 5, in an alternative embodiment, block 49 could be suspended from the inner walls of Z rail 18 by pads 53, so that the center of gravity of block 49 is actually disposed below pads 53.

Figure 3:
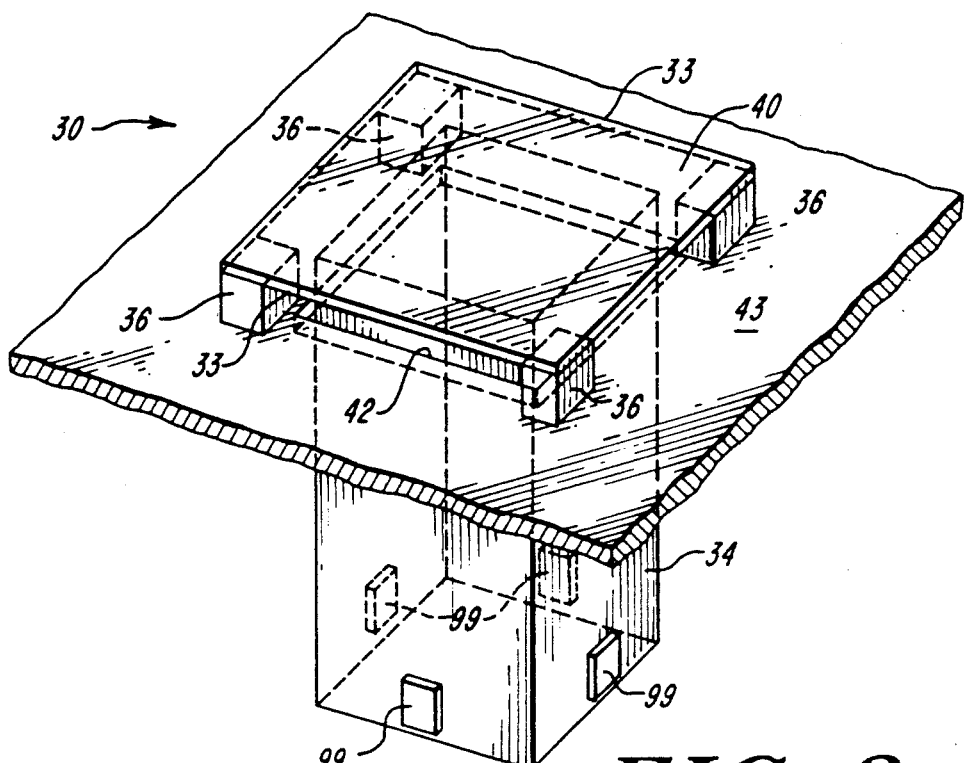
FIG. 3 is a perspective view of the gantry vibration damper of this invention.

Preferably, pads 53 are constructed of a low resiliency, highly energy absorbent material, such as that used for pads 36 of the gantry vibration damper of FIG. 3. While four pads 53 are shown in FIG. 5, any number of pads 53 may be used having any desired shape, so long as pads 53 support block 49 in noncontacting relationship with walls 55 and plate 51 of Z-rail 18. Additional pads 53 (not shown) may be placed along the vertical walls 55 of Z-rail 18 to ensure that block 49 never directly touches any part of Z-rail 18.

Damper 50 operates in substantially the same manner as vibration damper 30, except that the major mode of the Z-rail vibration tends to be at a higher frequency than that of structure 16, and damper 50 must be tuned to this higher frequency. The inertia of block 49 during acceleration and deceleration of carriage 24, or structure 16, tends to create vibrations in damper 50 which are at a slightly lower frequency than, but out-of-phase with respect to, the resulting vibrations in Z-rail 18. This out-of-phase relationship results from a delay with respect to Z-rail 18 in the application of torque by block 49 because of the inherent elongation characteristics of pads 53 which cause block 49 to stop moving during deceleration or start moving during acceleration only after pads 53 reach their limit of stretching or elongation in response to the inertia of block 49. Since the torque applied by the mass of Z-rail 18 is greater than the torque applied by block 49, the vibrations are not immediately reduced to zero. However, the result is a rapid damping of the vibrations, decreasing substantially the settling time of the system. The vibrations are absorbed, and the vast majority of the resulting energy is quickly dissipated as heat in pads 53. Because pads 53 flex in all directions equally damper 50 serves to damp vibrations in the Y-Z plane resulting from motion of carriage 24, as well as vibrations in the X-Z plane resulting from motion of structure 16.

Both damper 30 and damper 50 must be tuned to produce optimal dampening. Tuning is accomplished by selecting the proper mass for blocks 34 and 49 and the proper stiffness for pads 36 and 53. Because of the relative stiffness of carriage 24, the dynamic system of the coordinate measuring machine of FIG. 2 can be viewed for purposes of analysis as having two superimposed systems, each having a single degree of freedom. Therefore, damper 30 and damper 50 can be described as simple auxiliary mass dampers. See for example Harris and Crede, Shock and Vibration Handbook (2nd Edition), Copyright 1976, by McGraw-Hill, Inc.. As given by Harris and Crede (pp. 6-3 to 6-14), the optimum dimensionless damping parameter for each of dampers 30 and 50, for maximum dissipation of energy is set forth hereinbelow:

$$S_{optimal} \text{ equals } (1 - Ba^2)/2Ba^2$$

where Ba equals W/Wa, a dimensionless tuning parameter, where W equals the natural frequency of the primary mass (i.e. structure 16 or Z-rail 18), and where Wa equals the natural frequency of an auxiliary mass (i.e. block 34 or block 49).

$S_{optimal}$, as defined by Harris and Crede, should be about 0.25, and thus Ba equals 0.8. Once the natural or resonant frequency of structure 16 or Z-rail 18 has been determined, the natural frequency of respective vibration dampers 30 or 50 can be determined, elastomer pads of proper stiffness and energy absorbency can be selected and an appropriate structure can be defined.

Typically, in a gantry type structure such as that shown in FIG. 2, the major natural frequency of the Z-rail is significantly higher than the major natural frequency of structure 16. As a rule, the higher the natural frequency of the primary mass, the smaller is the mass that should be used as an auxiliary mass.

The exact mass to be used for either block 34 or block 49 can be determined by solving the foregoing equation for the natural frequency of the auxiliary mass, once the natural frequency of the respective structure 16 or Z-rail 18 has been determined. It is well known that this natural frequency, $W_a$ can be found from the following relationship, $W_a = \frac{1}{2}\pi\sqrt{c/m}$, where C equals the stiffness of the spring system represented by respective pads 36 or 53 and blocks 34 or 49 and where M equals the mass of respective blocks 34 or 49. Thus, once the desired natural frequency of damper 30 or 50 has been determined, the stiffness of the pads and the mass of the block can be adjusted to produce the desired frequency. The stiffness of the system represented by the combination of the block 34 or 49 and respective pads 36 or 53 is determined by the particular material used for pads 36 or 53, the thickness of the pads, and the surface area of the pads joining the respective blocks 34 and 49 to plate 40 and plate 51 respectively. The greater the surface area of respective pads 36 and 53, the stiffer is the system. Similarly, the less the thickness of pads 36 and 53, the less is the stiffness of the system, and the lower the rebound resilience of the material, the stiffer is the system.

Typically, block 34 has a weight which is in the range of from about 25% to about 50% of the combined weight of support 17, the extended part of Y-rail 20, carriage 24 and Z-rail 18. Typically, block 49 has weight in the range of from about 25% to about 50% of the extended part of Z-rail 18.

Figure 6:
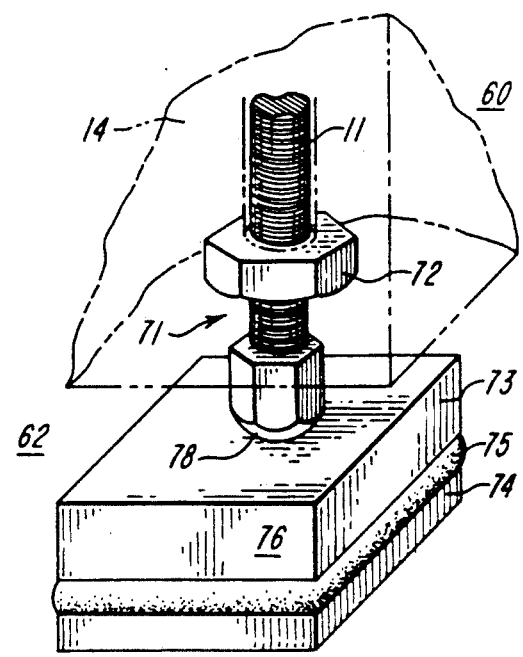
FIG. 6 is a partial, perspective view of the table vibration damper of this invention.

The table support vibration damper 60 of this invention will now be described with particular reference to FIGS. 2 and 6. Vibration damper 60 includes a plurality of elements 62, as shown in FIG. 6, which support table 14 above floor 15. (FIG. 2). In a preferred embodiment, four of such elements 62 are used, although any number of elements 62 greater than two may be used. All such elements 62 are identical, and only one element 62 is shown in FIG. 6 for purposes of illustration. Each element 62 comprises a rigid load bearing member 71 resting in unsecured relation on a support pad 76. Member 71 typically is a screw which can be threaded into a cooperatively threaded hole in the bottom of table 14, but member 71 could also be any other sufficiently strong, rigid element coupled to table 14 for support thereof. Typically, member 71 is retained in place by a lock nut 72. The lower end 78 of member 71 resting on pad 76 typically is rounded, although it need not be.

Pad 76 comprises three elements, an upper rigid plate 73, a lower rigid plate 74, and a layer 75 of a low resiliency, highly energy absorbent material sandwiched between plates 73 and 74. Plates 73 and 74 typically are comprised of steel, and should be sufficiently thick to not deform when a load is applied by table 14. With respect to layer 75, any material is acceptable which has high energy absorbency and low rebound resilience, i.e. less than 20% resiliency, measured by the pendulum method as described by Zwick (DIN 53512). The preferred material has a relatively high durometer, such as a Shore "A" hardness of about 64 as measured according to ASTM D22404, an elongation at break of about 340%, and a tensile strength of about 1500 psi. The preferred material also should have a maximum compression set of 4% according to ASTM D-3-95 and a maximum ball rebound of 5% according to ASTM D3-574-1c. An example of a suitable foam or elastomer is that manufactured in the manner described in U.S. Pat. No. 4,722,946, which is incorporated herein by reference. A commercially available foam or elastomer made in accordance with U.S. Pat. No. 4,722,946 is sold under the trademark VISCOLITE by Polymer Dynamics, Inc. of Lehigh Valley, Pennsylvania. If a polyurethane foam such as VISCOLITE is used for layer 75, a thickness of about one half inch (1.27 cm) is preferred.

Elements 62 provide both frictional and viscous damping of vibrations, and are tuned to provide a natural frequency of vibration of elements 62 slightly below the major mode of the natural frequency of vibration of gantry 16 about the X-axis drive 23.

As structure 16 is rapidly accelerated or decelerated in the X-direction, vibrations of the table 14 are produced in response. Layer 75 absorbs these vibrations and re-emits these vibrations at the same frequency, but with a time delay, creating a phase shift relative to the major mode of the natural frequency of vibration of structure 16. This phase shift in the re-emitted vibrations causes them to cancel out the vibrations in structure 16. Also, vibrations are damped by frictional damping in layer 75 in which frictional movement of the cell walls with respect to one another within layer 75 causes layer 75 to convert the vibrations to heat which is dissipated. Any residual vibrations typically are sufficiently low as to not affect the measuring accuracy. Vibrations emanating from Z-rail 18 are also damped. Although elements 62 are not precisely tuned to the higher frequency of the Z-rail vibrations, sufficient damping is provided so that the residual Z-rail vibrations are not sufficiently great to affect the measuring accuracy.

Figure 7:
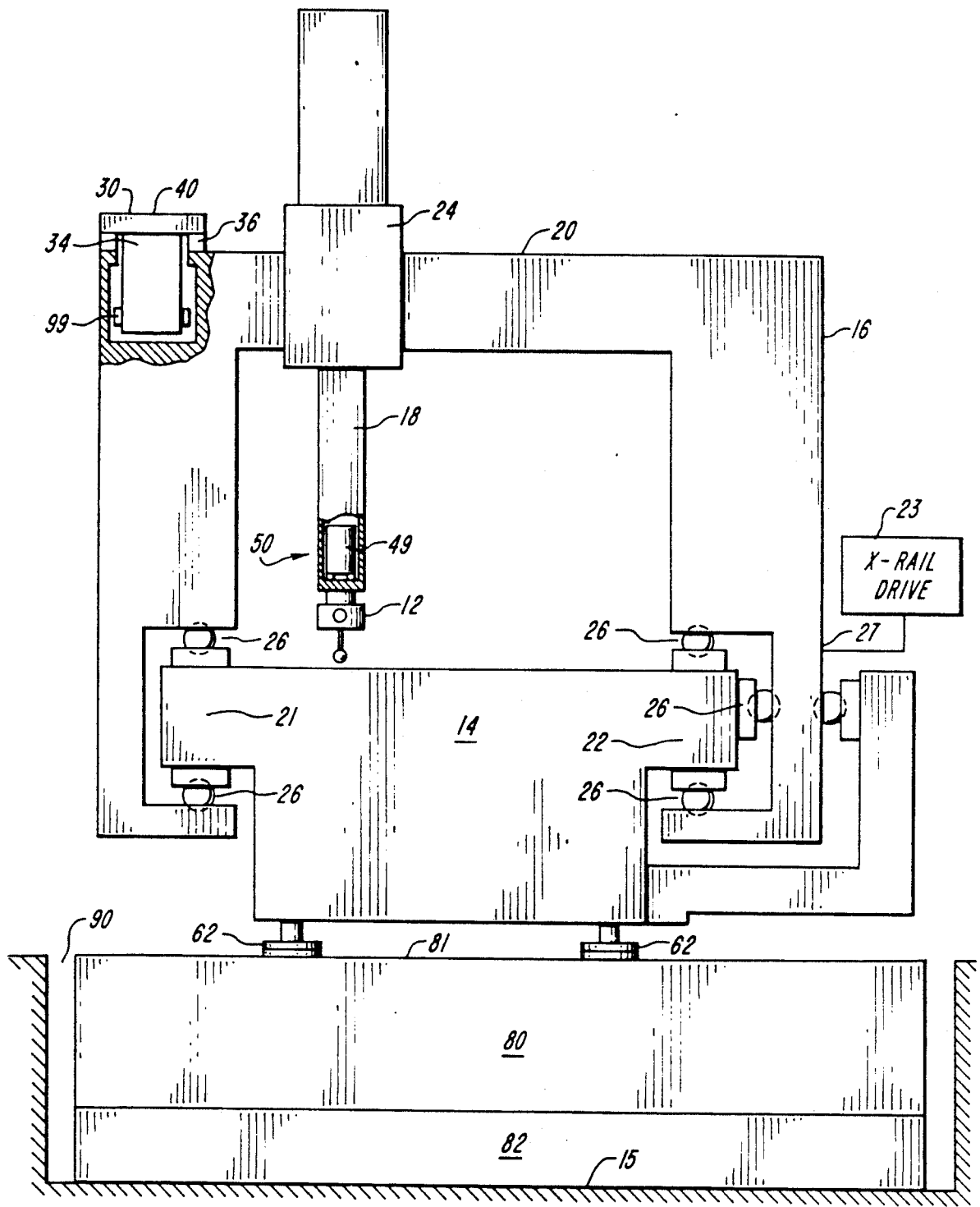
FIG. 7 is a cross-sectional side view of the vibration dampening system of this invention with a vibration isolation system.

With particular reference to FIG. 7, another embodiment of the table support vibration damper of the present invention will now be described for use with a machine having a vibration isolation system for table 14. Frequently, it is desirable to isolate table 14 from the underlying supporting floor 15. Vibrations originating in floor 15 can be transmitted to table 14, impacting the accuracy of the measurements taken by probe 12. Typically, table 14 is isolated from such vibrations in floor 15 by using either an active isolation system with an automatic leveling control or a passive isolation system. An example of an active isolation system is an air bag with valves which continually take in, expel and redistribute air to keep the system level at all times in response to the position of structure 16 and carriage 24. An example of a passive isolation system is a pad of foam or other like material which absorbs vibrations emanating from floor 15.

If table support vibration damper 60 is used in conjunction with either of the vibration isolation system described above, damper 60 will not work properly unless certain modifications are made as shown in FIG. 7. The table support vibration damper 60 of FIG. 6 is a relatively stiff system, while the foregoing vibration isolation systems commonly used in the prior art are typically low frequency, low stiffness systems. Such low frequency, low stiffness systems provide better isolation, while higher stiffness is required for damping. If elements 62 are placed in direct contact with a prior art vibration isolation system, the low stiffness of the vibration isolation system will inhibit proper damping of the vibrations emanating from table 14, as these vibrations will be transmitted to the vibration isolation system and not be damped, thus neutralizing or overriding table support vibration dampening system 60.

The foregoing problem is overcome by the provision of a substantial auxiliary mass 80 beneath table 14, as shown in FIG. 7. Elements 62 rest directly on an upper surface 81 of mass 80, and mass 80 is in turn supported by a prior art, conventional, active or passive vibration isolation system 82. Mass 80 should be substantial, and typically is equal to or larger than the weight of machine 10.

Typically, isolation system 82 and mass 80 are disposed in a recess 90 formed in floor 15, as shown in FIG. 7. In this manner, table 14 is disposed at a level above floor 15 necessary for proper operation of machine 10.

Mass 80 disposed between table 14 and isolation system 82 dynamically isolates the stiff and well damped damper 60 from the soft and low damped prior art isolation system. The lower frequency system 82 has little or no effect on the effectiveness of system 60. Therefore, system 60 is permitted to function properly to dampen vibrations, without being neutralized by system 82.

Figure 4:
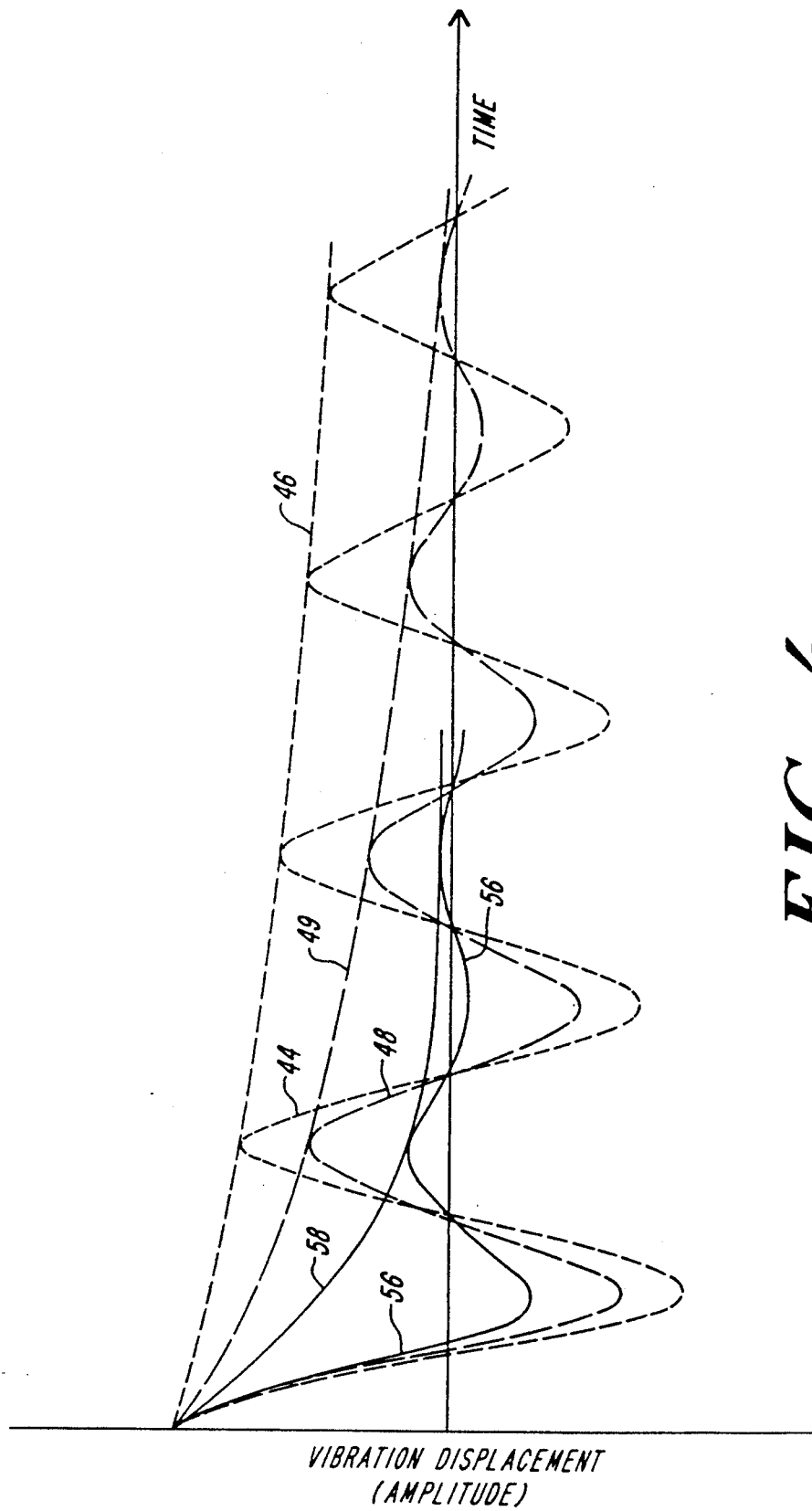
FIG. 4 is a graph showing a plot of amplitude of vibration versus time for the machine of the present invention and for a prior art machine.

FIG. 4 illustrates the approximate improvement in settling time achieved by the vibration dampening system of the present invention, including dampers 30, 50 and 60, in a gantry-type coordinate measuring machine. In FIG. 4, the vertical axis or ordinate represents the amplitude of the vibrations, while the horizontal axis or abscissa represents the elapsed time. Curve 44 of FIG. 4 illustrates the approximately sinusoidal vibration of a prior art, gantry-type structure 16 about an axis in the X direction without dampers 30, 50 and 60. Curve 46 represents the envelope of the amplitude of the vibration shown in curve 44. Curve 48 illustrates the approximately sinusoidal vibration of the same prior art gantry structure 16 with the use of only damper 30 of the present invention. Curve 49 represents the envelope of the amplitude of the vibrations shown in curve 48. Curve 56 illustrates the approximately sinusoidal vibration of gantry structure 16 using damper 30, damper 50 and damper 60. Curve 58 represents the envelope of the amplitude of the vibrations of curve 56.

The substantial reduction of the settling time of structure 16 utilizing the vibration damping system of the present invention is readily apparent from a comparison of curve 58 with curve 46. A typical prior art gantry type coordinate measuring machine without the vibration damping system of the present invention has a settling time of approximately 3 to 4 seconds, or about 35 cycles. The same prior art gantry type coordinate measuring machine utilizing the vibration dampening system of the present invention has a settling time of about 0.2 seconds, or about 2 cycles. Thus, the vibration dampening system of the present invention reduces the settling time of a gantry type coordinate measuring machine by more than an order of magnitude, significantly reducing the time it takes to perform an inspection of a part being tested. Damper 50 and damper 30 each reduce the settling time of the vibrations in structure 16 by a factor of about 4 to 5 while the contribution of damper 60 is substantially less. Thus, a gantry-type coordinate measuring machine utilizing damper 30, damper 50 and damper 60 can perform an inspection of a part under test in approximately 1/20th of the time required for a comparable prior art machine.

Having described one preferred embodiment of the present invention, it should be obvious to those skilled in the art that various modifications and alterations are possible without departing from the scope of the invention. Such obvious modifications and alterations are intended to be included within the scope of the invention which is not to be limited by the above discussion of a single preferred embodiment. The only limitations upon the scope of the invention are defined by the appended claims and their equivalents.

What is claimed is:

1. A coordinate measuring machine comprising:
   a base;
   a table disposed on said base for supporting a part to be measured;
   a pair of spaced, parallel X-rails mounted on said base;
   two support members, one support member being slidable along each of said two X-rails;
   a Y-rail aligned in a direction generally orthogonal to said X-rails and extending between said support members;
   a carriage slidable along said Y-rail;
   a Z-rail mounted on said carriage in slidable relation therewith in a direction generally normal to said Y-rail and to said X-rails;
   means associated with one of said X-rails for driving said support members and said Y-rail along said X-rails; and
   means disposed on said Y-rail in spaced relation with said driving means for dampening vibrations of said support members and said Y-rail resulting from acceleration and deceleration of said support members by said driving means, said dampening means comprising a block having a substantial mass with a center of gravity and being supported by a low resiliency material, said supporting means supporting said block only on one side of said block spaced from the center of gravity of said block, said block having a weight in the range of from about 25 percent to about 50 percent of the combined weight of one of said support members, said Y-rail, said carriage and said Z-rail.

2. A coordinate measuring machine as recited in claim 1 wherein said dampening means is disposed generally in overlying relationship with the other of said X-rails.

3. A coordinate measuring machine as recited in claim 1 wherein said low resiliency material comprises a highly energy absorbent pad for supporting said block in noncontacting relationship with said Y-rail.

4. A coordinate measuring machine as recited in claim 3 further comprising a plate affixed to an upper end of said block and having lateral portions thereof extending beyond lateral surfaces of said block, said pad being disposed between said lateral portions of said plate and confronting surfaces of said Y-rail.

5. A coordinate measuring machine as recited in claim 3 wherein said pad supports said block only on one side thereof above a center of gravity of said block.

6. A coordinate measuring machine as recited in claim 1 further comprising a second vibration damper associated with said Z-rail for dampening vibration in the Z-rail, said Z-rail vibration damper comprising:
   a second block having a substantial mass disposed within said Z-rail at a position spaced from said carriage; and
   means for supporting said second block within said Z-rail in noncontacting relationship with said Z-rail, said supporting means being formed of a low resilience, highly energy absorbent material.

7. A coordinate measuring machine as recited in claim 1 further comprising:
   means disposed between an underlying floor and said base for supporting said base in spaced relation with respect to the floor; and
   second dampening means associated with said supporting means and having a layer of a low resiliency, highly energy absorbent material for dampening vibrations in said coordinate measuring machine.

8. A vibration damper for a precision positioning apparatus including a base, a pair of spaced rails disposed on the base, two supports, one support riding on each of the rails, a ridge extending between the supports, vertically movable means suspended from the bridge, means associated with one of the rails for driving the bridge and supports along the rails, and means for moving the vertically movable means in a generally horizontal direction along the bridge, said vibration damper comprising:
   a block having a substantial mass disposed on the vertically movable means at a position spaced from the moving means; and
   means for supporting said block in noncontacting relationship with the vertically movable means, said supporting means supporting said block only on one side of said block spaced from a center of gravity of said block, said supporting means being formed of a low resiliency, highly energy absorbent material.

9. A vibration damper as recited in claim 8 wherein said supporting means comprises a foam pad.

10. A vibration damper as recited in claim 9 wherein said pad is formed of a polyurethane foam.

11. A vibration damper as recited in claim 8 wherein said supporting means is formed of a material having a Shore "00" hardness of 50 00.

12. A vibration damper as recited in claim 8 wherein said supporting means is formed of a material having a rebound resilience less than 20% as measured by the pendulum method.

13. A vibration damper as recited in claim 8 wherein said supporting means supports said block only along one side thereof below a center of gravity of said block.

14. A vibration damper as recited in claim 8 wherein said block has a weight in the range of from about 25 percent to about 50 percent of the weight of the portion of said vertically movable means extending below said moving means.

15. A coordinate measuring machine comprising:
   a base;
   a table disposed on said base for supporting a part to be measured;
   a pair of spaced, parallel X-rails mounted on said base;
   two support members, one support member being slidable along each of said two X-rails;
   a Y-rail aligned in a direction generally orthogonal to said X-rails and extending between said two support members,
   a carriage slidable along said Y-rail;
   a Z-rail mounted on said carriage in slidable relation therewith in a direction generally normal to said Y-rail and to said X-rails;
   means associated with said carriage for moving said carriage along said Y-rail; and
   means for damping vibrations in said Z-rail resulting from acceleration and deceleration of said carriage by said moving means, said dampening means comprising:
   a block having a substantial mass disposed on said Z-rail at a position spaced from said carriage, said block having a weight in the range of from about 25 percent to about 50 percent of the weight of the portion of said Z-rail extending below said carriage; and means for supporting said block in noncontacting relationship with said Z-rail, said supporting means supporting said block only on one side of said block spaced from a center of gravity of said block.

16. A coordinate measuring machine as recited in claim 15 wherein said supporting means supports said block only on one side of said block at a position below a center of gravity of said block.

17. A coordinate measuring machine as recited in claim 15 further comprising means disposed on said Y-rail for dampening vibrations of said support members and said Y-rail and means for supporting said base having means for dampening vibrations from said table.

18. A vibration damper for a precision positioning apparatus including a base, a pair of spaced rails disposed on the base, two supports, one support riding on each of the rails, a bridge extending between the supports, and means associated with one of the rails for driving the bridge and supports along the rails, said vibration damper comprising:

rigid means for supporting the base in spaced relation with a floor;

dampening means associated with said supporting means having a layer of a low resiliency, highly energy absorbent material;

means disposed between said rigid supporting means and a floor for isolating the precision positioning apparatus from vibrations from the floor; and a substantial mass disposed between said rigid supporting means and said isolating means, said substantial mass having a weight no less than the weight of the precision positioning apparatus.

19. A vibration damper as recited in claim 18 wherein said dampening means comprises two rigid plates having said layer of material disposed therebetween.

20. A vibration damper as recited in claim 18 wherein said layer of material has a Shore "00" hardness of about 64, an elongation at break of about 340% and a tensile strength of about 1500 psi.

21. A coordinate measuring machine comprising:
a base;
a table disposed on said base for supporting a part to be tested;
a pair of spaced, parallel X-rails mounted on said base;
two support members, one support member being slidable along each of said X-rails;
a Y-rail aligned in a direction generally orthogonal to said X-rails and extending between said support members;
a carriage slidable along said Y-rail;
a Z-rail mounted on said carriage in slidable relation therewith in a direction normal to said Y-rail and to said X-rails;
means associated with one of said X-rails for driving said support members and said Y-rail along said X-rails;
means for driving said Z-rail;
means disposed on said Y-rail in spaced relation with said X-rail driving means for dampening vibrations of said support members and said Y-rail resulting from acceleration and deceleration of said support members;
means disposed within said Z-rail in spaced relation with said Z-rail driving means for dampening vibrations of said Z-rail resulting from acceleration and deceleration of said support members;
means for supporting said base having means for damping vibrations in said machine;
a substantial mass disposed between said supporting means and an underlying floor, said substantial mass having a weight no less than the combined weight of said base, said table, said X-rails, said support members, said Y-rail, said carriage, said Z-rail and both said driving means; and
means disposed between said substantial mass and the floor for isolating said table from vibrations form the floor.

22. A machine as recited in claim 21 wherein said vibration dampening means in said Y-rail comprises:
a block having a substantial mass; and
a low resiliency, highly energy absorbent material for supporting said block in noncontacting relationship with said Y-rail.

23. A machine as recited in claim 21 wherein said Z-rail vibration dampening means comprises:
a block having a substantial mass; and
a low resiliency, highly energy absorbent material for supporting said block in noncontacting relationship with said Z-rail.

24. A machine as recited in claim 21 wherein said vibration dampening means in said supporting means comprises:
an upper rigid plate;
a lower rigid plate;
a layer of a low resiliency, highly energy absorbent material disposed between said plates.

25. A vibration dampening system for damping vibrations in a precision positioning apparatus including a base, a pair of spaced rails disposed on the base, two supports, one support riding on each of the rails, a bridge extending between the supports, means associated with one of the rails for diving the bridge and supports along the rails, vertically movable means suspended form the bridge, means for moving the vertically movable means in a generally horizontal direction along the bridge, and base support means disposed between the base and an underlying floor, said vibration dampening system comprising:
a first block having a substantial mass;
first means for supporting said first block on the bridge only on one side of said block spaced from a center of gravity of said block at a fixed position spaced from the driving means in noncontacting relationship with the bridge, said supporting means comprising a low resiliency, highly energy absorbent material having a rebound resilience less than 20 percent as measured by the pendulum method;
a second block having a substantial mass disposed on the vertically movable means at a position spaced from the moving means;
second means for supporting said second block on the vertically movable means only on one side of said block spaced from a center of gravity of said block in noncontacting relationship with said vertically movable means, said second supporting means being formed of a low resiliency, highly energy absorbent material having a rebound resilience less than 20 percent as measured by the pendulum method; and
dampening means associated with the base support means and including a layer of a low resiliency, highly energy absorbent material disposed between two rigid members.

26. A coordinate measuring machine comprising:
a base;
a table disposed on said base for supporting a part to be measured;
a pair of spaced, parallel X-rails mounted on said base;
two support members, one support member being slidable along each of said two X-rails;
a Y-rail aligned in a direction generally orthogonal to said X-rails and extending between said support members;
a carriage slidable along said Y-rail;
a Z-rail mounted on said carriage in slidable relation therewith in a direction generally normal to said Y-rail and to said X-rails;
rigid means for supporting said base in spaced relation with an underlying floor;
dampening means associated with said rigid supporting means and comprising two rigid plates having a layer of low resiliency, highly energy absorbent material disposed therebetween;
a substantial mass disposed between said rigid supporting means and the underlying floor, said substantial mass having a weight no less than the combined weight of said base, said table, said X-rails, said support members, said Y-rail, said carriage, and said Z-rail; and
means disposed between said mass and the floor for isolating said table from vibrations from the floor, said isolating means being dynamically isolated from said dampening means by said substantial mass to permit said dampening means to damp vibrations emanating from said table.

27. A coordinate measuring machine comprising:
a base;
a table disposed on said base for supporting a part to be measured;
a pair of spaced, parallel X-rails mounted on said base;
two support members, one support member being slidable along each of said two X-rails;
a Y-rail aligned in a direction generally orthogonal to said X-rails and extending between said support members;
a carriage slidable along said Y-rail;
a Z-rail mounted on said carriage in slidable relation therewith in a direction generally normal to said Y-rail and to said X-rails;
means associated with one of said X-rails for driving said support members and said Y-rail along said X-rails;
first means disposed on said Y-rail in spaced relation with said driving means for damping vibrations of said support members and said Y-rail, said first vibration damping means comprising a first block and means for supporting said first block in non-contacting relationship with said Y-rail, said second block having a weight in the range of from about 25 percent to about 50 percent of the combined weight of one of said support members, said Y-rail, said carriage and said Z-rail, said first block being supported only on one side at a position spaced from a center of gravity of said block by a low resiliency material;
second means for damping vibrations in said Z-rail comprising a second block disposed on said Z-rail at a position spaced from said carriage and means for supporting said second block in noncontacting relationship with said Z-rail, said second block having a weight in the range of from about 25 percent to about 50 percent of the weight of said Z-rail disposed below said carriage, said second block being supported only along one side thereof spaced from a center of gravity of said second block;
rigid means for supporting said base in spaced relation with an underlying floor;
third vibration damping means associated with said rigid supporting means;
a substantial mass disposed between said rigid supporting means and the underlying floor, said substantial mass having a weight no less than the combined weight of said base, said table, said X-rails, said support members, said Y-rail, said carriage said Z-rail and said driving means; and
means disposed between said mass and the floor for isolating said table from vibrations from the floor.

28. A precision positioning machine, comprising:
a base;
first and second X-rails mounted on said base in spaced and parallel relationship with each other;
a first support member slidable along said first X-rail;
a second support member slidable along said second X-rail;
a gantry aligned in a direction generally orthogonal to said X-rails, said gantry extending between and being connected to said first and said second support members;
means coupled to said first support member along said first X-rail for driving said first support member, said gantry and said second support member together in a direction parallel to said X-rails; and
first means for dampening vibrations of said support members and said gantry resulting from acceleration and deceleration of said first support member, said second support member and said gantry by said driving means, said first dampening means being disposed on a selected one of said gantry and said second support member in spaced relation with said driving means, said dampening means comprising a block having a mass in the range of from about 25 percent to about 50 percent of the combined weight of at least said second support member and said gantry, said block being supported by low rebound resilience, highly energy absorbent viscoelastic means providing said block with a natural frequency lower than that of said gantry and said support members whereby said block vibrates out of phase with the vibrations of said gantry and said support members.

29. A precision positioning machine comprising:
a base;
first and second X-rails mounted on said base in spaced and parallel relationship with each other;
a first support member slidable along said first X-rail;
a second support member slidable along said second X-Rail;
a Y-rail extending between said support members and being aligned in a direction generally orthogonal to said X-rails;
means for driving said first and second support members and said Y-rail along said X-rails;
a carriage, slidable along said Y-rail;

second means associated with said Y-rail for driving said carriage along said Y-rail;

a Z-rail associated with and movable with respect to said carriage;

third means for driving said Z-rail with respect to said carriage;

first means disposed in a selected one of said Y-rail and X-rails for dampening vibrations in said Y-rail and said support members resulting from acceleration and deceleration thereof; and second means disposed on said Z-rail for dampening vibrations of said Z-rail and said carriage resulting from acceleration and deceleration of said carriage along said Y-rail, said second dampening means comprising a block supported by low rebound resilience, highly energy absorbent viscoelastic means providing a natural frequency that is lower than that of said carriage and Z-rail, whereby said block vibrates out of phase with the vibrations of said carriage and said Z-rail;

said first and second dampening means cooperatively dampening vibrations in said carriage, said Z-rail, said first and second support members and said Y-rail.

30. The precision positioning machine of claim 29, further comprising:

rigid means for supporting said base in spaced relation with a floor;

third dampening means associated with said rigid supporting means having a layer of a low rebound resilience, highly energy absorbent. viscoelastic material, said material both viscously damping and elastically dampening vibrational motion of the base relative to the floor for cooperatively dampening vibrations in the precision positioning machine.

31. The precision positioning machine or claim 29, further comprising:

means for supporting said base having means for damping vibrations in said machine;

a substantial mass disposed between said supporting means and an underlying floor, said substantial mass having a weight no less than the total weight of said machine; and means disposed between said substantial mass and the underlying floor for isolating said base from vibrations of the floor.

* * * * *